Patented Apr. 7, 1942

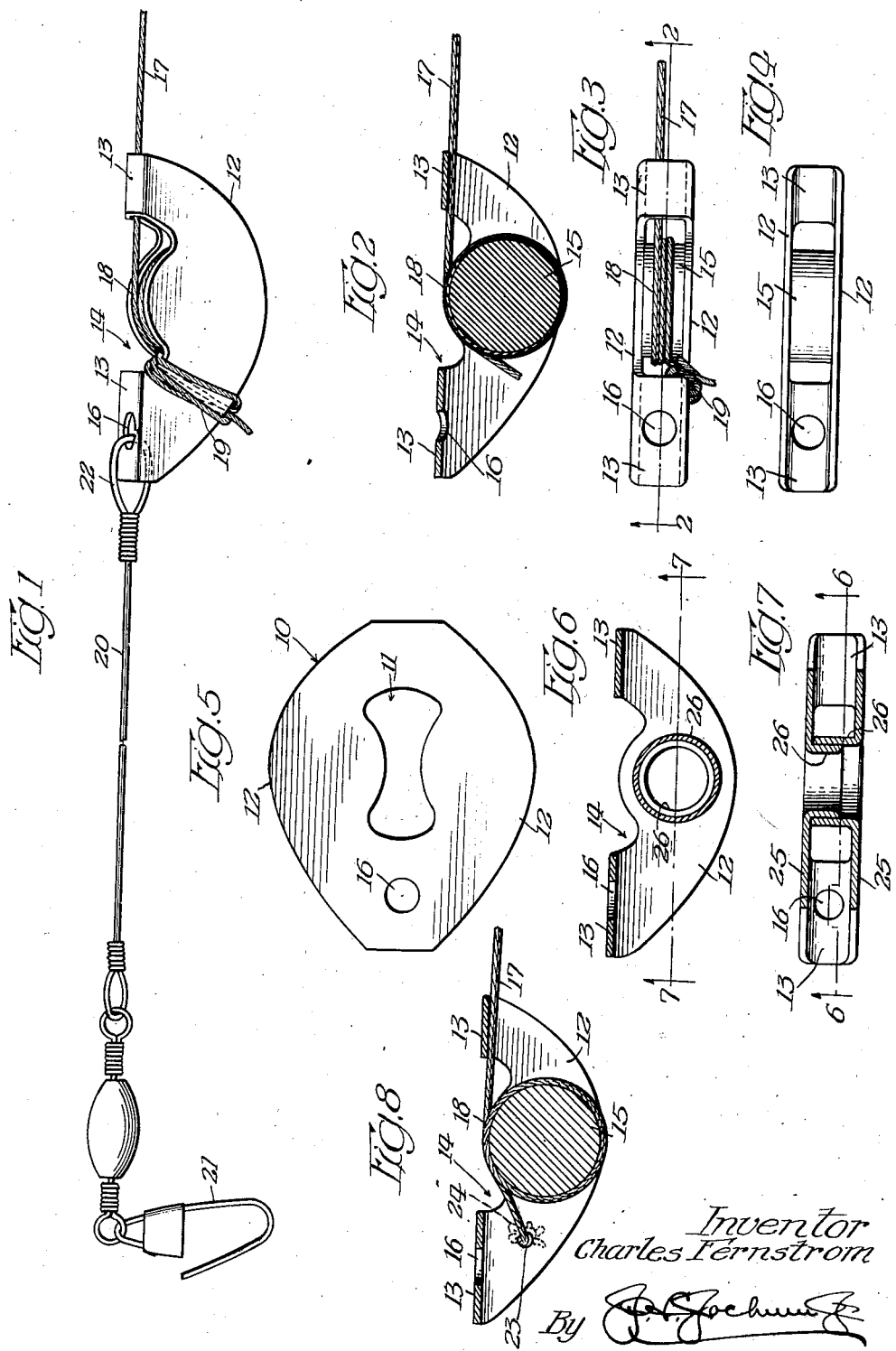

2,278,842

UNITED STATES PATENT OFFICE 2,278,842

ATTACHMENT FOR FISHING LINES

Charles Fernstrom, Oak Island, Minn., assignor of one-half to Carl A. Johnson, Louis Aanerud, and George Stokes, all of Chicago, Ill., jointly Application April 21, 1941, Serial No. 389,517

16 Claims. (Cl. 24—129)

This invention relates to improvements in attachment for fishing lines but more particularly to an improved and inexpensive fastening means whereby the bait, hook or leader may be attached to the line without the necessity of forming or providing knots between the parts. It has been found that fishing lines generally break at the point where the knot is made, due to the fact that considerable strain is exerted at that point where the line crosses over itself.

It is one of the objects of the present invention to provide an improved simple and efficient fastening device for securing the bait or hook to the line without the necessity of knotting or tying the parts together.

To the attainment of these ends and the accomplishment of other new and useful objects as will appear, the invention consists in the features of novelty in substantially the construction, combination and arrangement of the parts hereinafter more fully described and claimed and shown in the accompanying drawing illustrating this invention, and in which Figure 1 is a view showing an attachment of this character constructed in accordance with the principles of this invention, secured to the end of a fishing line.

Figure 2 is a sectional view taken on line 2—2 Figure 3.

Figure 3 is a top plan view of an attachment of this character.

Figure 4 is a view similar to Figure 3 with the line omitted.

Figure 5 is a plan view of the blank from which the attachment is made.

Figure 6 is a sectional view taken on line 6—6 Figure 7 of a modified form of the invention.

Figure 7 is a top plan view of Figure 6.

Figure 8 is a view similar to Figure 2 of another form of the invention.

Referring more particularly to the drawing, the numeral 10 designates a blank of any suitable size and configuration from which the attachment is formed. A portion of the blank is cut out, as at 11, and the blank is bent upon itself to form a substantial U-shape or channel member comprising sides 12 and connecting portions 13 between the sides.

A portion of the channel at the closed edge is cut away as at 14 and arranged between the side members 12 is a spacer 15 which may be of any desired size and configuration and may be secured in place and against displacement with respect to the body member in any suitable manner. The diameter of the spacer 15 is considerably less than the length of the cut away portion 14, and arranged within one of the connecting or cross portions 13 is an aperture 16. In use the line 17 is threaded into the channel member under one of the cross portions 13 and wound any desired number of times around the spacer member, as at 18, and the extremity of the line may be wound any desired number of times around one of the side members 12 between the periphery of the spacer 15 and the cross member 13 and then the line may be given a hitch, as at 19, so as to tie the end of the line about said body member. The cut away portions 14 on each side of the spacer 15 serve as a hitch anchor in the form of the invention shown in Figure 1.

The leader 20 having a hook or catch 21 in one end thereof is secured to the line tied in any suitable manner preferably by means of a loop 22 that passes through the aperture 16 in the cross member 13.

With this improved construction it will be manifest that the line 17 and the leader 20 may be connected together securely without forming any knots or ties in either line or leader. In the form of the invention shown in Figure 8, one of the said members 12 of the tie may be provided with an opening 23 through which the end of the line after it has been wound one or more times about the spacer 15 may be threaded and the extremity of the line after it passes through the opening 23 is formed into a knot 24 so that in this form of the invention the formation of the hitch 19 in the line will be provided.

In the forms of the invention shown in Figures 1, 2, 3, 4 and 8 the spacer member 15 is formed of a separate piece of material and inserted between the side members 12 and secured in any suitable manner. In the form of the invention shown in Figures 6 and 7 the spacing means between the side members 25 is formed by stamping or drawing out of the side member 25 a tubular portion 26, one of which tubular portions telescopes with the other and the telescoping portions may be secured in any suitable manner.

What is claimed as new is:

1. A connector for fishing lines comprising laterally spaced, substantially parallel side members having at their extremities cross members, providing a comparatively narrow channel-shaped body, said cross-members being spaced from each other, and spacing means between said body members intermediate and spaced from said cross-members and about which spacing means a portion of a line threaded through the said body portion of a line threaded through the said body intermediate one of said cross-members and said spacing means serving as an anchor about which another portion of the line is hitched.

2. A connector for fishing lines comprising a body embodying laterally spaced side members, spaced cross-members connecting the body members adjacent the extremities of the latter, there being an opening through one of said cross members, and a spacer between said body members intermediate and spaced from both ends of said body, one end of said body being shaped to form a line hitch anchor.

3. A connector for fishing lines comprising a body embodying laterally spaced side members connected adjacent their ends by cross members, there being an opening through one of said cross members, a spacer between said body members intermediate and spaced from both of said cross-members, one end of said body being shaped to form a line hitch anchor, said spacer being formed by stamping out a portion of the said body.

4. A connector for fishing lines and hooks comprising laterally spaced body members connected adjacent their ends by cross members, said cross members being disposed in planes at substantially right angles to the planes of said body members, there being an opening through one of said cross members, and spacing means between said body members intermediate and spaced from said cross members, one end of said body adjacent one of the cross members being reduced to provide a line hitch anchor.

5. A connector for fishing lines and hooks comprising laterally spaced body members connected adjacent their ends by cross members, said cross members being disposed in planes at substantially right angles to the planes of said body members, and spacing means between said body members intermediate and spaced from said cross members, one end of said body adjacent one of the cross members being reduced to provide a line hitch anchor, the said spacing means being integral with said body members.

6. A connector for fishing lines and hooks comprising laterally spaced body members connected adjacent their ends by cross members, said cross members being disposed in planes at substantially right angles to the planes of said body members, and spacing means between said body members intermediate and spaced from said cross members, one end of said body adjacent one of the cross members being reduced to provide a line hitch anchor, the said spacing means being formed by deflecting a portion of said body members.

7. A connector for fishing lines and hooks comprising laterally spaced body members connected adjacent their ends by cross members, said cross members being disposed in planes at substantially right angles to the planes of said body members, and spacing means between said body members intermediate and spaced from said cross members, one end of said body adjacent one of the cross members being reduced to provide a line hitch anchor, the said spacing means being disposed within the confines of the edges of said body member.

8. A connector for fishing lines embodying a body portion formed from a single piece of material bent into shape to provide spaced side members, and connecting portions adjacent the ends thereof, the portion of the body members adjacent one of said connecting members being reduced to provide a line hitch projection, and a spacer between said side members intermediate and spaced from both of said connecting members.

9. A connector for fishing lines embodying a body portion formed from a single piece of material bent into shape to provide spaced side members, and connecting portions adjacent the ends thereof, the portion of the body members adjacent one of said connecting members being reduced to provide a line hitch projection, there being an aperture through one of the said connecting members, and a spacer between said side members intermediate and spaced from both of said connecting members, the said spacer being formed by inwardly deflected portions of said body members.

10. A connector for fishing lines embodying a body portion formed from a single piece of material bent into shape to provide spaced side members and connecting portions adjacent the ends thereof, the portion of the body members adjacent one of said connecting members being reduced to provide a line hitch projection, there being an aperture through one of the said connecting members, and a spacer between said side members intermediate and spaced from both of said connecting members, the said spacer being formed by inwardly deflected portions of said body members, all of said parts being formed from a single piece of sheet material.

11. A connector for fishing lines comprising a body embodying spaced side members shaped to form reduced projecting portions adjacent their ends and connected by spaced cross members, there being an opening through one of said cross members, and spacer means between said body members intermediate and spaced from the said projecting portions, all of said connector being of an integral rigid construction.

12. A connector for fishing lines comprising a body embodying spaced side members shaped to form reduced projecting portions adjacent their ends and connected by cross members, there being an opening through one of said cross members, and spacer means between said body members intermediate and spaced from the said projecting portions, all of said connector being formed from a single piece of sheet material.

13. A connector for fishing lines embodying as an integral structure a body formed of a single piece of sheet material bent upon itself to provide spaced side members, a portion of the connected edges being cut away to provide an opening terminating short of the ends of the body to provide spaced connecting portions between said sides, and a spacer between said sides to receive a line wrapped therearound, said spacer being of a diameter less than the space between said connecting portions and substantially filling the space between the adjacent portions of said side members.

14. A connector for fishing lines embodying a body formed of a single piece of material bent into a channel formation having open ends, a portion of the folded edge of the body spaced for a substantial distance from each end being cut away, and a spacer member between the walls of the channel, the diameter of the spacer member being substantially less than the space formed by the said cut away portion of said body.

15. As an article of manufacture, a connector for fishing lines and hooks comprising a body of an open channel configuration, provided with an opening of substantial length through the bottom of the channel, and a spacer member between the walls of the channel and substantially within the confines of the body, said spacer member being of a diameter less than the length of said opening, the dimension of the walls of said body between the periphery of said spacer member and the adjacent end of said opening being substantially less than the dimension of said walls between the end of the slot and the adjacent extremities of said walls.

16. As an article of manufacture, a connector for fishing lines and hooks comprising a body of a comparatively narrow channel configuration, provided with an opening of substantial length through the bottom of the channel, and a spacer member between the walls of the channel and substantially within the confines of the body, said spacer member being of a diameter less than the length of said opening, the dimension of the walls of said body between the periphery of said spacer member and the respective ends of said opening being substantially less than the dimension of the said walls between the ends of the slot and the respective adjacent extremities of said walls, there being an additional opening through the bottom of the channel adjacent one end of said body.

CHARLES FERNSTROM.